(12) United States Patent
Neubauer

(10) Patent No.: US 6,616,437 B1
(45) Date of Patent: Sep. 9, 2003

(54) DEVICE FOR CONTINUOUSLY PRODUCING SEAMLESS PLASTIC TUBES

(75) Inventor: Gerhard Neubauer, Königsberg (DE)

(73) Assignee: Unicor GmbH Rahn Plastmaschinen, Hassfurt (DE)

( * ) Notice: Subject to any disclaimer, the term of this patent is extended or adjusted under 35 U.S.C. 154(b) by 0 days.

(21) Appl. No.: 09/744,341

(22) PCT Filed: Jul. 13, 1999

(86) PCT No.: PCT/DE99/02182

§ 371 (c)(1),
(2), (4) Date: Jan. 23, 2001

(87) PCT Pub. No.: WO00/07801

PCT Pub. Date: Feb. 17, 2000

(30) Foreign Application Priority Data

Aug. 4, 1998 (DE) .......................... 198 35 189

(51) Int. Cl.⁷ .................. B29C 47/06; B29C 47/20; B29C 47/26
(52) U.S. Cl. .............. 425/133.1; 425/190; 425/326.1; 425/336; 425/380; 425/461; 425/462
(58) Field of Search .................. 425/133.1, 190, 425/326.1, 336, 462, 380, 461

(56) References Cited

U.S. PATENT DOCUMENTS

| | | |
|---|---|---|
| 3,677,676 A | 7/1972 | Hegler |
| 3,743,456 A | 7/1973 | Cini |
| 3,809,515 A | 5/1974 | Farrell |
| 3,932,102 A | 1/1976 | Rosenbaum |
| 4,203,715 A | 5/1980 | Raley et al. |
| 5,076,776 A | * 12/1991 | Yamada et al. .......... 425/133.1 |
| 5,690,972 A | * 11/1997 | Planeta et al. ........... 425/133.1 |

FOREIGN PATENT DOCUMENTS

| | | |
|---|---|---|
| DE | 1 964 675 | 7/1971 |
| DE | 24 03 618 | 8/1975 |
| DE | 27 52 932 | 5/1979 |
| DE | 28 03 708 | 9/1980 |
| DE | 29 11 833 | 7/1988 |
| DE | 42 35 101 | 4/1994 |
| DE | 42 18 095 | 12/1994 |
| DE | 295 17 378 | 11/1996 |
| EP | 0 208 055 | 1/1987 |
| EP | 0 230 055 | 7/1987 |
| EP | 0 419 983 | 4/1991 |
| EP | 0 420 019 | 4/1991 |
| EP | 0 542 272 | 5/1993 |
| EP | 0 703 055 | 3/1996 |
| FR | 2 625 941 | 7/1989 |
| WO | WO 96/33856 | 10/1996 |
| WO | WO 98/08669 | 3/1998 |

OTHER PUBLICATIONS

Patent Abstracts of Japan publication No. 58045038, entitled DISK TYPE EXTRUDER HEAD, By Morisawa Tokio, published Mar. 16, 1983.

* cited by examiner

Primary Examiner—James P. Mackey
Assistant Examiner—Joseph Leyson
(74) Attorney, Agent, or Firm—Bachman & LaPointe, P.C.

(57) ABSTRACT

Proposed is a device for continuously producing seamless plastic tubes, wherein provided as a distributor element for the molten material to be fed to an annular gap is a distributor plate which is arranged within the cross-section of the mold cavity and in which the molten plastic material is passed to the peripheral surface of the distributor plate substantially radially with respect to the direction of production by way of distribution passages which branch tree-like, wherein the flow path of the molten plastic material is the same in each of the individual distribution passages between the entry opening and the peripheral surface

6 Claims, 5 Drawing Sheets

DEVICE FOR CONTINUOUSLY PRODUCING SEAMLESS PLASTIC TUBES

BACKGROUND OF THE INVENTION

The invention concerns a device for continuously producing seamless plastic tubes, in which at least one molten plastic extrusion issuing from an extruder is split up by means of a distributor plate which is arranged within the cross-section of a mold cavity of the device and which has plastic material distribution passages with flow paths of equal length for the molten plastic material, and fed to an annular gap from which the tubular plastic material flow formed in that way passes into the mold cavity formed for example by travelling corrugator mold jaws, wherein the plastic material distribution passages extend in a plane approximately perpendicular to the axis of the mold cavity and each terminate at an equal angular spacing from each other at a peripheral surface of the distributor plate.

In the production of plastic tubes, the molten material issuing from the extruder must be fed to an annular gap from which it then passes into the actual mold cavity. In the production of corrugated tubes, whether of a single-layer or multi-layer nature, the molten material may only issue at one location from the annular gap at which the corrugator mold jaws forming the mold cavity again bear firmly against each other, that is to say, the mold cavity is again completely closed. Now, the greater the diameter of the tube to be produced, the correspondingly greater become the entry radii of the mold jaws, which means at the same time that the nozzles of the injection heads, which form the annular gap or a plurality of annular gaps for the molten material, become correspondingly longer and longer. Nozzles of such a length are both very expensive to produce and also difficult to handle, while in particular adjustment and setting of the tube wall thickness gives rise to difficulties since, as will be appreciated, the nozzles may not bear against the moving mold jaws. On the other hand however the spacing between the annular gap from which the molten material issues and the inside wall of the travelling mold jaws may not be excessive, in order not to give rise to molding problems. Those difficulties occur very severely in particular when not just single-wall corrugated tubes but corrugated tubes consisting of two or more layers are to be produced, preferably with different materials, which means that two successive annular gaps have to be fed with material from different extruders, for which purpose the molten plastic material must then be guided into the mold cavity in separate annular passages arranged concentrically one within the other, in a forward direction to the point of injection of the individual molten material layers. If the assembly has such long and very narrow flow paths, enormously high back pressures necessarily build up, which in turn gives rise to certain problems. For example, DE 24 03 618 A1, DE 28 03 808 C3, DE 29 11 833 C2, EP 0 208 055 A1, EP 0 230 055 A2 and U.S. Pat. No 3,677,676 disclose embodiments which are used in a practical context, for corrugator injection heads.

In the known corrugator injection heads, the material is divided up to form a tube by means of a torpedo, a central divider spindle or a spiral distributor. If for example a composite tube is produced with just one extruder, that is to say the inner and the outer skins are made from the same plastic material, then in most cases, after the first step of dividing up the material to form a tube, a second division operation is effected by means of a cutting ring disposed at a downstream location. Transportation of the plastic material into the corrugator or mold cavity has hitherto always been effected in long annular passages arranged concentrically relative to each other. In that case, at least the first material division operation to form a tube is always effected in the proximity of the extruder, in which respect the structure involved means that the outside diameters produced are far above the inside diameter of the tube which is to be subsequently produced. That naturally means that a corresponding amount of space must be provided for the corrugator injection head. When the material is divided up to form a tube by means of a so-called 'torpedo', it is observed moreover when dealing with given plastic materials that the radial arms which serve to fix the torpedo in position in the molten material passage produce marks in the plastic tube, and such marks possibly even result in corresponding weakening and thus reduced quality of the finished tube. To eliminate marks of that kind or to achieve an adequate level of quality, it is however at least necessary to operate with a considerable back pressure in the flow passage, and that overall considerably increases the level of complication and expenditure.

A further problem in the production of a composite tube but under some circumstances also in the production of single-wall plastic tubes, is that calibration or cooling bars or mandrels have to be fitted subsequently to the annular nozzles within the mold cavity in order to smooth and cool the tube from the interior. Those components mean that the length of the injection head is again considerably increased, in which respect the particular problem is that the injection head can no longer be supported or braced over its entire length between the entry into the mold cavity and the end of the cooling or calibration mandrel, whereby major stability and vibration problems occur, which makes itself extremely disturbingly perceptible in terms of production and the end product.

A device of the general kind set forth, having an annular gap tool for the extrusion of thermoplastic material, is known from DE 27 52 932 A1. There, the molten plastic material is fed by way of an annular passage to a spiral pre-distributor. Disposed between the spiral pre-distributor and an annular gap is a distributor plate having a plurality of substantially radially extending plastic material distribution passages which are distributed uniformly over the periphery of the distributor plate. That design configuration of the tool admittedly makes it possible to reduce the axial structural length involved. A disadvantage with the known tool however is that the feed of molten plastic material to the distributor plate must be by way of an annular gap, with the consequence that the above-discussed structural problems of the known devices still occur. In particular, provision must be suitably made for fixing the parts which define the respective annular gaps, and this can be effected for example by way of suitable flow dividers (so-called torpedoes).

DE 42 18 095 discloses a head for extruding preforms of thermoplastic material, of a hose or tube form, wherein two distributor plates are arranged virtually axially in succession. In that arrangement, in the first distributor plate in the direction of flow, the molten plastic material which is fed to the mold radially from the exterior is fed to axial feed openings in the second distributor plate, by way of passages formed by a branching configuration. Then, those axial feed passages are adjoined in the second distributor plate, which is disposed at a downstream location in the flow direction, by passage portions which are substantially in the form of parts of a circle and which feed the molten material from the exterior to the exit gap which is nearer to the center of the mold tool. A disadvantage of this known arrangement is that the distributor plates are of a comparatively large diameter. In addition, as it passes through the various distributor passages, the molten plastic material experiences many very sharp changes in direction, which can result in deposits of the plastic material in the flow path and can thus result in the quality of the finished produced being adversely affected.

Therefore, the object of the present invention is to propose a device of the general kind set forth, for continuously producing seamless plastic tubes, which makes it possible to eliminate the above-discussed difficulties in the state of the art, while in particular the invention seeks to provide the possibility of bringing the molten plastic material from the extruder or extruders in feed passages of the largest possible size, as closely as possible to the exit annular gap of the injection nozzle within the mold cavity, in order in that manner to reduce the back pressure and to deal with the plastic material carefully.

SUMMARY OF THE INVENTION

In accordance with the invention, to attain that object, it is proposed that a device of the general kind set forth is such that at a spacing from its peripheral surface the distributor plate has an entry opening for the molten plastic material fed from the extruder, which entry opening forms the end of a feed passage for the molten plastic material, which extends substantially in the direction of production of the tube, and that the plastic material distribution passages branch tree-like from the entry opening, wherein the flow path for the molten plastic material between the entry opening and the peripheral surface of the distributor plate is equal in all distribution passages. In that respect, the expression 'branch tree-like' is used to mean that in each case there is only one division of a passage portion into two passage portions which continue further along, and that in addition the corresponding branches in the various branch passages are disposed at an equal spacing from the last branching. Accordingly, at the peripheral surface of the distributor plate, there is always a number of branch passages, which is a power of 2.

The device according to the invention differs quite substantially from the state of the art.

On the one hand, it is possible to use distributor plates of relatively small diameter so that they can be arranged within the mold cavity formed by the mold jaws or the like. That permits a substantial reduction in the structural length of the injection head in the working direction. It is particularly important that in accordance with the invention it is possible for the molten material feed passages to the distributor plates to be very generously dimensioned so that it is possible to operate with comparatively low pressures, but nonetheless sufficient molten material is fed to the annular gap or gaps. To connect the distributor plate to the corresponding injection head flange on the extruder, it is possible to use very simple and extremely strong components which make it possible to achieve both a considerable cost saving and also a marked improvement in mechanical strength and stability. The specific manner of distributing the molten plastic material in the distributor plates also affords the advantage that for example all problems which arise when using the so-called 'torpedo process' as a result of the molten material flow being divided at the support arms are not found to occur. In particular it has not been found that any marks formed by the partial flows of molten material, which issue from the distributor plate, appear on the finished tube, as was generally observed with the support arms which are required to fix a torpedo in place. It is very easily possible to produce the distributor plate with the appropriate distribution passages. For example, the distributor plate can be subdivided into a bottom part and a cover part, with the appropriate passages then being hollowed out in the contact surface or interface. In embodiments having a plurality of distributor plates, that is to say devices for producing multi-wall tubes, it would even be possible for the bottom part of a distributor plate to be used at the same time as the cover part of the other distributor plate. A further advantage of the technology according to the invention is that, as a result of the small structural size and structural length and the possibility of using very strong and stable holders for the distributor plates, it is also possible to provide for very clean and neat adjustment of the exit annular gap in the mold cavity. A device according to the invention is not observed to suffer from the adjustment and vibration problems which occur because of the considerable length of the known injection nozzles. Finally, the entry opening for the molten plastic material can be provided virtually at any location on the distributor plate, although it will generally be provided relatively close to the center of the distributor plate. At any event, without any difficulties there is the possibility of the distributor plate, possibly also a plurality of successively arranged distributor plates, being provided at its or their center with an opening therethrough for supply conduits, for example for water, power etc, which hitherto gave rise to serious difficulties because of the annular passages which usually start from the center of the injection head. Finally, supplying an injection head having a plurality of annular gaps from a plurality of extruders or from one extruder with corresponding division of the flow of molten material is also substantially simpler, in comparison with the state of the art, as it is only necessary in each case to provide comparatively large feed passages for the molten plastic material, which lead to the respective entry openings.

It has proven to be particularly advantageous if the end portions of the distribution passages, which open at the peripheral surface of the distributor plate, each extend arcuately, for example in the form of part of a circle, forming a spiral distributor, and are arranged in such a way that the molten plastic material entails both a rotational pulse in the peripheral direction and also a pulse in the radial direction. When the end portions of the distribution passages are of such a configuration, that affords particularly uniform distribution of the molten material over the periphery of the distributor plates and consequently also a correspondingly uniform discharge of molten material from the associated annular gap. In addition, that arrangement ensures that, in spite of the presence of a plurality of exit passages for the molten material along the periphery of the distributor plate, a continuous molten plastic material tube is produced, which in particular does not exhibit any marks as a consequence of the previous division of the flow of plastic material.

For producing multi-layer plastic tubes, the procedure involved is advantageously such that a plurality of distributor plates is arranged in succession in the direction of movement of the tube to be formed, that is to say in the direction of production, wherein the entry openings for the molten plastic material are displaced relative to each other in the individual distributor plates, and the feed passage for the respective distributor plate or plates following in the direction of movement passes through the previously arranged distributor plate or plates. In that case, the feed passages will generally be arranged symmetrically, that is to say at least at the same spacing from the center line of the mold. The through opening for the feed passage of another distributor plate can be provided in a distributor plate without major problems, because for that purpose it is only necessary for the distribution passages to be suitably arranged around the through opening which permits the molten material for other distributor plates to pass therethrough.

Finally, it is also in accordance with the invention for different distributor plates to be fed from different extruders, in which case it is precisely the device according to the invention that also readily affords the possibility, for example when dealing with triple-wall tubes, of feeding two of the distributor plates from one extruder and the third distributor plate from another extruder. In the same manner, it is also possible for all distributor plates to be fed from one extruder, in which case then a suitable distributor, for example a distributor box or a Y-distributor, is arranged between the extruder and the feed passage leading to the individual distributor plates.

BRIEF DESCRIPTION OF THE DRAWINGS

Further features, details and advantages of the invention will be apparent from the description hereinafter of an embodiment of a device for producing double-wall corrugated tubes, with reference to the drawing in which.

DETAILED DESCRIPTION

Figure 1:
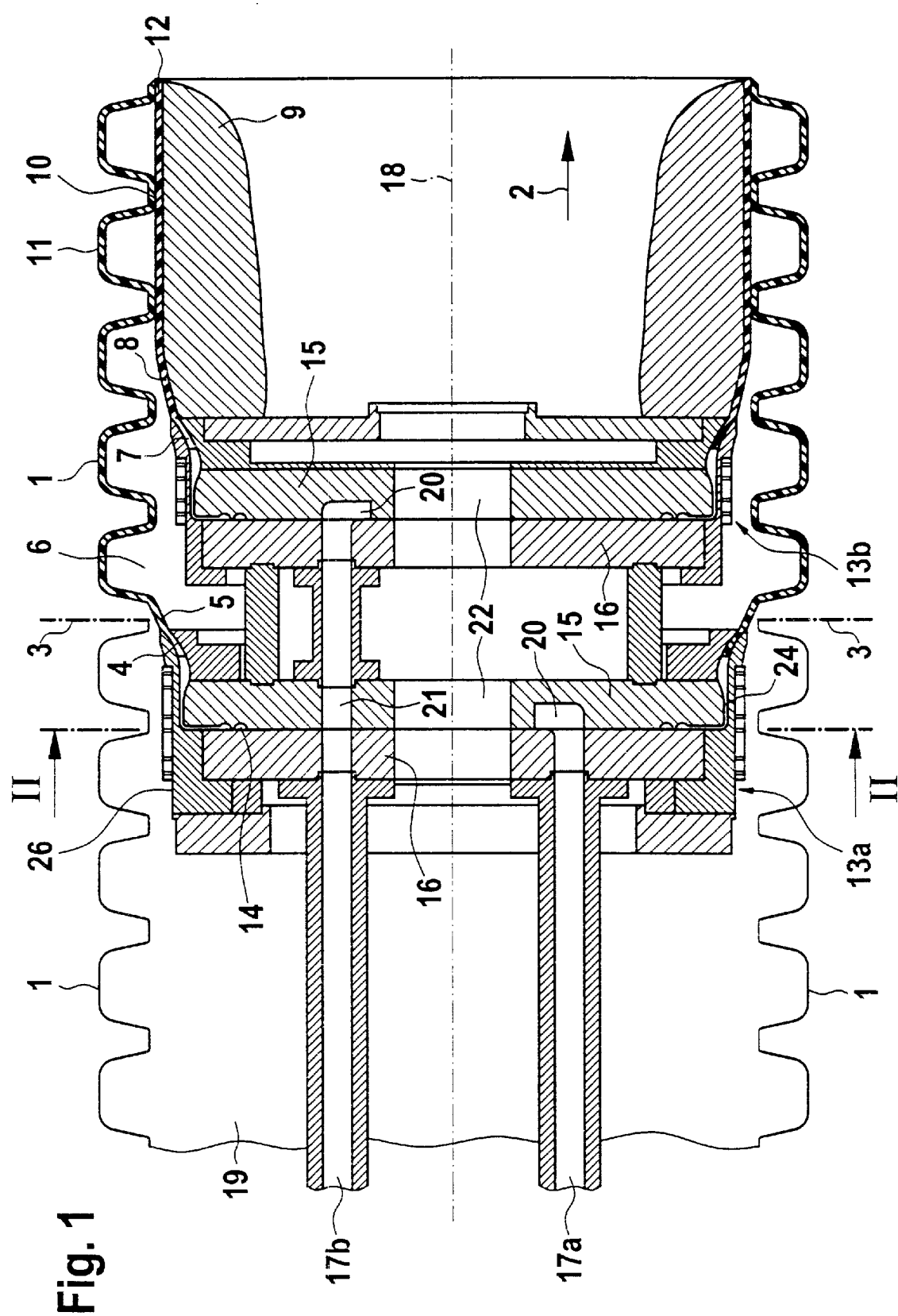
FIG. 1 is a diagrammatic view in longitudinal section showing the region of a device for producing double-wall corrugated tubes, in which the molten plastic material issues from distributor plates and is shaped in corrugator mold jaws to form a corrugated tube.

FIG. 1 diagrammatically shows at 1 the correspondingly corrugated inside wall of a corrugator mold jaw, with a plurality of corresponding mold jaws occurring in immediate succession in the direction 2 of production of the corrugated tube. The contact surface of two mold jaws is indicated by the line 3 in FIG. 1.

Production of the multi-wall corrugated tube is effected in known manner in such a way that a first tubular flow 5 of molten plastic material, which issues from an annular gap 4, is applied by suitable means, for example increased pressure applied in the space 6, against the inside wall 1 of the corresponding mold jaw which is moving uniformly in the direction of production 2. In the direction of production 2, the annular gap 4 is then followed by a further annular gap 7 from which a tubular flow 8 of a molten plastic material also issues. That molten plastic material tube is pressed against the regions 10 of the outside wall 11 of the corrugated tube to be formed, by means of a bar or mandrel 9 whose precise configuration is dependent on the respective plastic material used, and the specific form of the tube and so forth, and which for that reason is not described in greater detail here. The temperature while the inner tube 8 of the corrugated tube is being pressed against the outside wall 11 is so selected that welding of the outside wall 11 and the inside wall 12 takes place in the regions 10, thus resulting in a corresponding corrugated tube with a ribbed outside wall 11 and a smooth inside wall 12.

In terms of the procedure for forming the corrugated tube itself, the device diagrammatically shown in FIG. 1 completely corresponds to the state of the art.

The essential difference between the device shown in FIG. 1 and the state of the art is to be found in the way in which the molten plastic material is fed to the annular gaps 4 and 7.

It will be seen from FIG. 1 that, for that purpose, there are two distributor plates which are generally identified by references 13a and 13b respectively. Those two distributor plates are basically of the same structure. It will be noted however that the diameter of the annular slot 4 for the outside wall 11 in the illustrated embodiment is somewhat larger than the diameter of the annular slot 7 for the inside wall 12 and correspondingly also the diameters of the distributor plates 13a and 13b are somewhat different. That is necessary in order to ensure that the outside wall 11 of the corrugated plastic tube, which already bears against the inside wall 1 of the mold jaws, does not come into contact with the distributor plate 13b.

Each of the distributor plates 13a and 13b includes two plate-like elements, more specifically a first plate 15 which has openings 14 serving as distribution passages, and a second plate 16 which covers over the openings 14 and thus completes the distribution passages.

The feed of the molten plastic material from the extruder to the distributor plates 13a, 13b is effected by way of feed passages 17 which extend substantially in the production direction 2 and which are displaced with respect to the center line 18 of the mold cavity formed by the corrugator mold jaws, which feed passages 17 can be of comparatively large cross-section. The feed passages 17 each terminate at an entry opening 20 of the corresponding distributor plates 13a, 13b, from which the distribution passages then extend (see FIG. 2).

While the feed passage 17a terminates in the first distributor plate 13a (for the outside wall 11), the second feed passage 17b passes through the first distributor plate 13a in the form for example of a bore 21.

Provided at the center of each of the two distributor plates 13a and 13b is a respective through opening 22, through which for example supply conduits for power, air or water to the cooling or calibration mandrel 9 can be passed.

Figure 2:
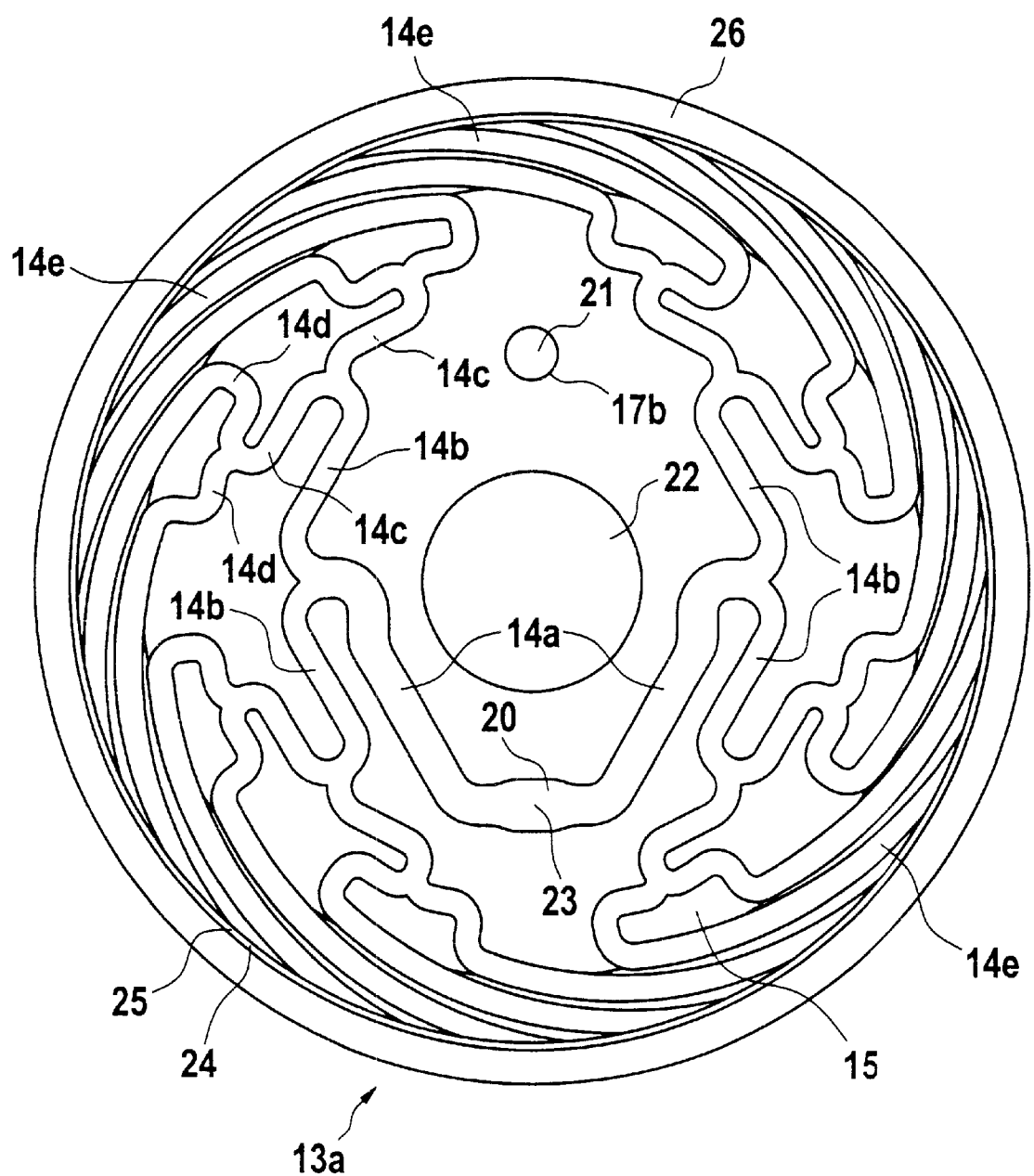
FIG. 2 is a plan view of the downstream-disposed part of a distributor plate corresponding to line II—II in FIG. 1, FIG. 3 diagrammatically shows a device for producing a double-wall corrugated tube using two extruders, and FIGS. 4 and 5 diagrammatically show two different arrangements for producing double-wall corrugated tubes, starting from one extruder.

FIG. 2 diagrammatically shows an example of how the distribution passages can be arranged in the distributor plate 13a.

Two first distribution passage portions 14a which can be formed by corresponding grooves in the form of recesses or openings extend in opposite directions from the entry opening 20. Then, at equal spacings from the center 23 of the entry opening 20, those distribution passage portions 14a in turn each branch into two identical distribution passage portions 14b which are of a cross-section that is reduced in relation to the distribution passage portion 14a, and which are also formed by grooves in the first plate 15. The distribution passage portions 14b —which are now four in number—branch again, in each case at an identical spacing from the branching of the distribution passage portions 14a, into once again two distribution passage portions 14c of once again reduced cross-section. The eight distribution passage portions 14c then again branch—once again at identical spacings from the branching of the portions 14b —to each form two respective distribution passage portions 14d. Those sixteen portions 14d then go at an identical spacing from the associated branching of the distribution passage portions 14c, into arcuate distribution passage portions 14e which terminate at the peripheral surface 24 of the first plate 15.

That peripheral surface 24 of the first plate 15 is surrounded, at a small spacing, forming an annular gap 25, by an outer ring 26 which is only shown by way of indication in FIG. 2 and the cross-section of which can be seen from FIG. 1.

The configuration of the passage portions 14e, as is shown in FIG. 2, in conjunction with the annular gap formed along the peripheral surface 24 of the first plate 15, has the effect of a spiral distributor, wherein the selected arrangement means that the molten plastic material which flows by way of the distribution passage portions 14a through 14e experiences both a rotational pulse in the peripheral direction and also a pulse in the radial direction. The described configuration of the end portions 14e of the distribution passages, which is essentially apparent from FIG. 2, provides that the individual partial flows of plastic material, which issue from the end portions 14e, are very well mixed and blended and a highly homogeneous, tubular plastic material flow is produced in the gap 25 between the peripheral surface 24 of the plate 15 and the outer ring 26. That tubular plastic material flow then correspondingly issues into the actual exit annular gap 4 or, in the case of the distributor plate 13, into the annular gap 7, and forms the respective tube walls 11 and 12 respectively.

It will be apparent from FIG. 1 that the faces of the distributor plates 13a and 13b remain substantially free. In that way, it is possible to use very solid massive fixing means for the distributor plates 13a and 13b, whereby neat clean adjustment and correspondingly stable mounting thereof is possible. FIG. 1 also shows that the cross-section of the distributor plates can overall be kept smaller than the diameter of the annular gaps 4 and 7 respectively. In that way, it is possible for distribution of the plastic material in the form of a ring to occur overall within the cross-section of the mold cavity 19 and it is also possible for the mounting support to be caused to extend far into the mold cavity.

It will be appreciated that distributor plates corresponding to the distributor plates 13a and 13b respectively in the illustrated embodiment can also be used if only a single-layer tube is to be produced. In that case, only one single distributor plate is required. In addition, it will be appreciated that the distributor plates can also be used if tubes of a different kind, for example smooth, seamless tubes, are to be produced. In this case it is also not absolutely necessary to provide travelling mold jaws. In this situation, under certain circumstances, it would be possible to operate with a stationary outer mold and a corresponding core or mandrel.

Figure 3:
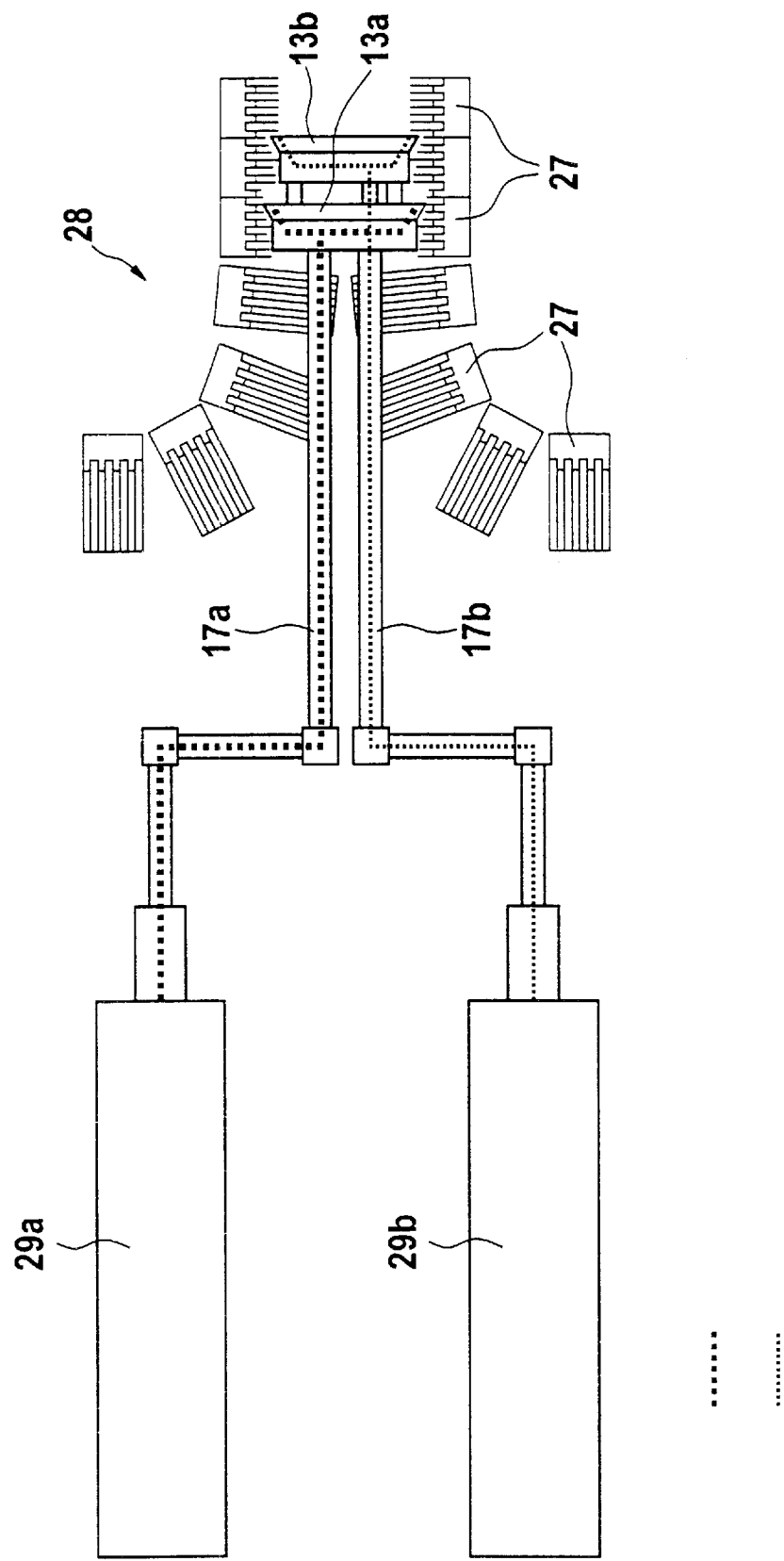
Figure 4:
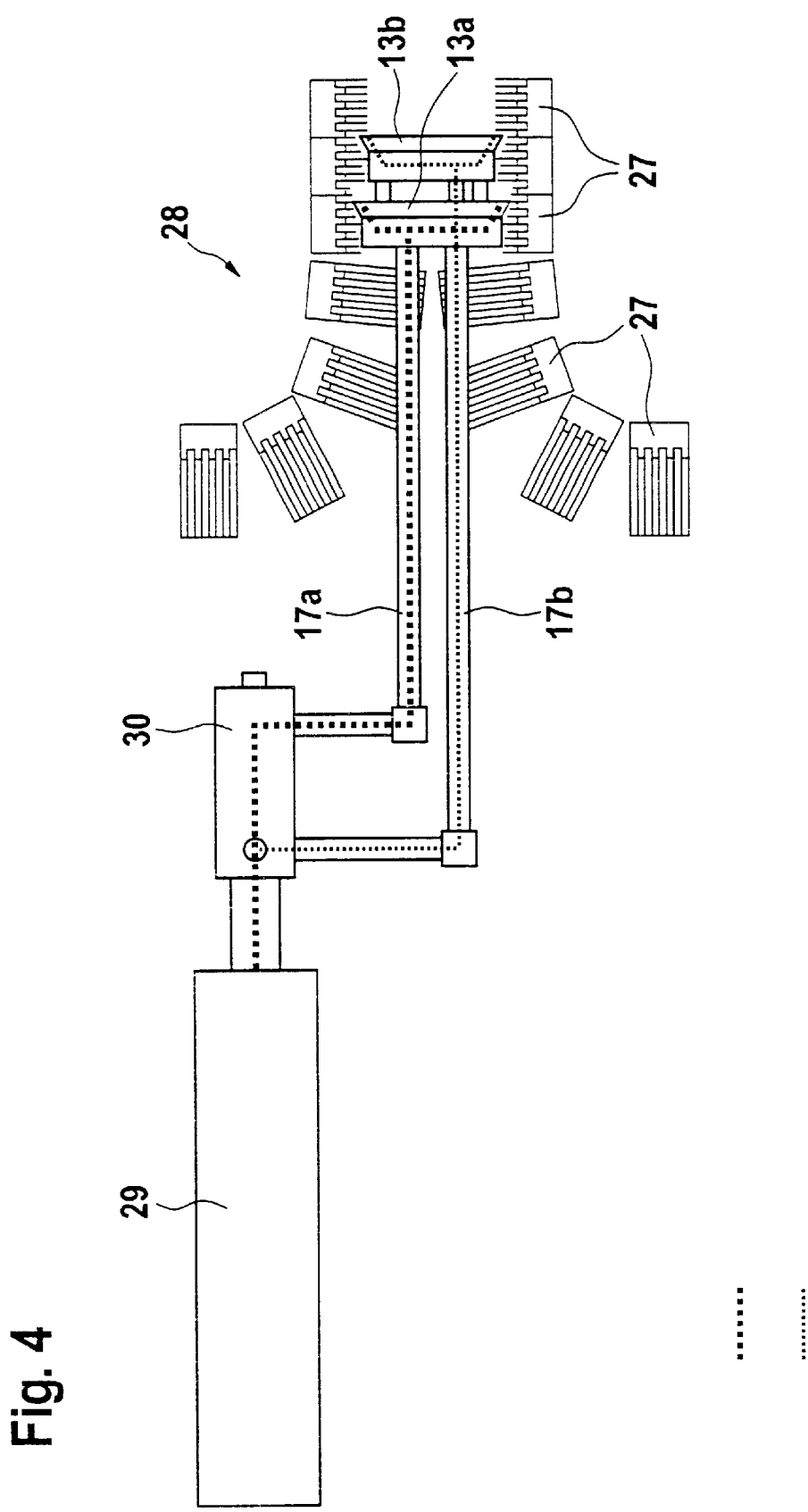
Figure 5:
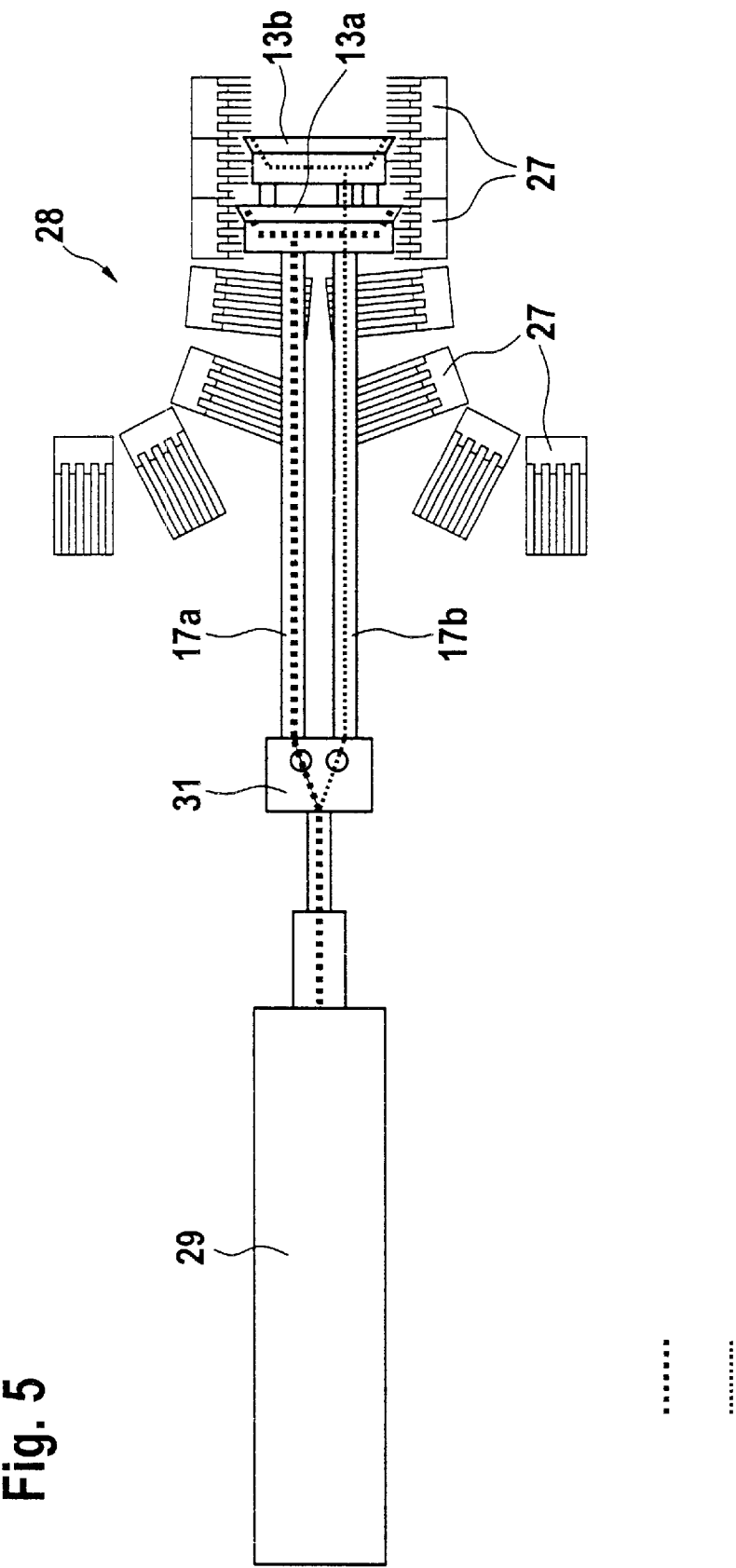

FIGS. 3 through 5 show diagrammatic arrangements as to the way in which devices for the production of corrugated tubes can be designed, using the concept of the invention, that is to say, using the special distributor plates.

FIGS. 3 through 5 each show in the right-hand part thereof a movable mold 28 formed by circulating mold jaw halves 27. As in the embodiment of FIG. 1, two distributor plates 13a, 13b are arranged in the movable mold 28, and are fed by way of feed passages 17a, 17b.

In the embodiment shown in FIG. 3, the inside and outside walls of the multi-layer corrugated tube are produced from different plastic materials. Accordingly, the arrangement also has two extruders, more specifically an extruder 29a which supplies the molten plastic material for the outside wall 11, and an extruder 29b for producing the molten plastic material for the inside wall 12.

The embodiments of FIGS. 4 and 5 admittedly also involve the production of double-wall corrugated tubes. It will be noted however that the inside and outside walls are to comprise the same material, for which reason the arrangement has only one extruder 29.

The difference between the embodiments of FIGS. 4 and 5 now essentially lies in the manner of distribution of the flow of plastic material issuing from the extruder 29, into the two feed passages 17a and 17b.

While the embodiment of FIG. 4 has a conventional distributor box 30 which is connected to the distributor plates 13a, 13b by way of comparatively long feed passages 17a, 17b, in the embodiment shown in FIG. 5 distribution of the flow of plastic material issuing from the extruder 29 is effected by way of a Y-distributor 31 to which the feed passages 17a, 17b are directly connected. Such an arrangement would not be conceivable in the conventional art, because it is not possible to produce tubular molten material flows extending in mutually concentric relationship, by means of a Y-distributor. The configuration shown in FIG. 5 thus represents a quite considerable simplification in relation to the hitherto conventional design.

As will be apparent from the foregoing description, the slight extent of the distributor plates in the production direction 2 means that no or only very slight speed vectors occur in the production direction during distribution of the molten material in the radial direction, in the flow of molten material, and that has an advantageous effect on the appropriate mixing action and tube-formation procedure. It would even be possible for the arrangement and configuration of the distribution passages to be such that negative speed vectors prevail within the distribution passages, in regard to the production direction 2, that is to say, the molten material is moved in opposite relationship to the production direction.

As a consequence of the small structural size, stability and possible variations, the described device therefore affords a large number of possible options for influencing the properties of tubes produced with the device, in dependence on the plastic material used.

What is claimed is:

1. A device for continuously producing seamless plastic tubes, wherein at least one molten plastic extrusion issuing from an extruder is split up by means of a distributor plate which is arranged within a cross-section of a mold cavity of the device and which has plastic material distribution passages with flow paths of equal length for the molten plastic material, and is fed to an annular gap from which a tubular plastic material flows into the mold cavity, wherein the plastic material distribution passages extend in a plane approximately perpendicular to an axis of the mold cavity and each terminate at an equal angular spacing from each other at a peripheral surface of the distributor plate, the improvement comprises that, at a spacing from the peripheral surface (24), the distributor plate (13a, 13b) has an entry opening (20) for the molten plastic material fed from the extruder (29, 29a, 29b) wherein the entry opening forms an end of a feed passage (17a, 17b) for the molten plastic material, which extends substantially in the direction (2) of production of the tube, the plastic material distribution passages (14 through 14e) branch in a tree-like manner from the entry opening (20), wherein the flow path for the molten plastic material between the entry opening (20) and the peripheral surface (24) of the distributor plate (13a, 13b) is equal in all distribution passages (14 through 14e).

2. A device as set forth in claim 1, wherein an end portion (14a) of each of the distribution passages (14 through 14e), which open at the peripheral surface (24) of the distributor plate (13a, 13b), each extend in a part-circular configuration, forming a spiral distributor, and are arranged in such a way that the molten plastic material experiences both a rotational pulse in the peripheral direction and also a pulse in the radial direction.

3. A device as set forth in claim 1, wherein the entry opening (21) for the molten plastic material into the distributor plate (13*a*, 13*b*) is arranged near the center of the distributor plate.

4. A device as set forth in claim 1, wherein the yogi distributor plate (13*a*, 13*b*) centrally has an opening (22) therethrough for a conduit to supply one of air, power, and coolant.

5. A device as set forth in claim 1, wherein a plurality of distributor plates (13*a*, 13*b*) are arranged in succession in the direction of movement (2) of the tube to be formed, each distributor plate having an entry opening (20) for the molten plastic material which are displaced relative to each other in the individual distributor plates (13*a*, 13*b*) and the feed passage (17*b*) for the respective distributor plate or plates (13*b*) following in the direction of movement (2) passes through the previously arranged distributor plate or plates (13*a*).

6. A device as set forth in claim 5 wherein each distributor plate (13*a*, 13*b*) is fed from a different extruder (29*a*, 29*b*).

* * * * *